Nov. 23, 1954
W. M. BRIGHT
2,695,251
METHOD OF PRODUCING ELASTIC ADHESIVE SHEETS
Filed Aug. 24, 1948
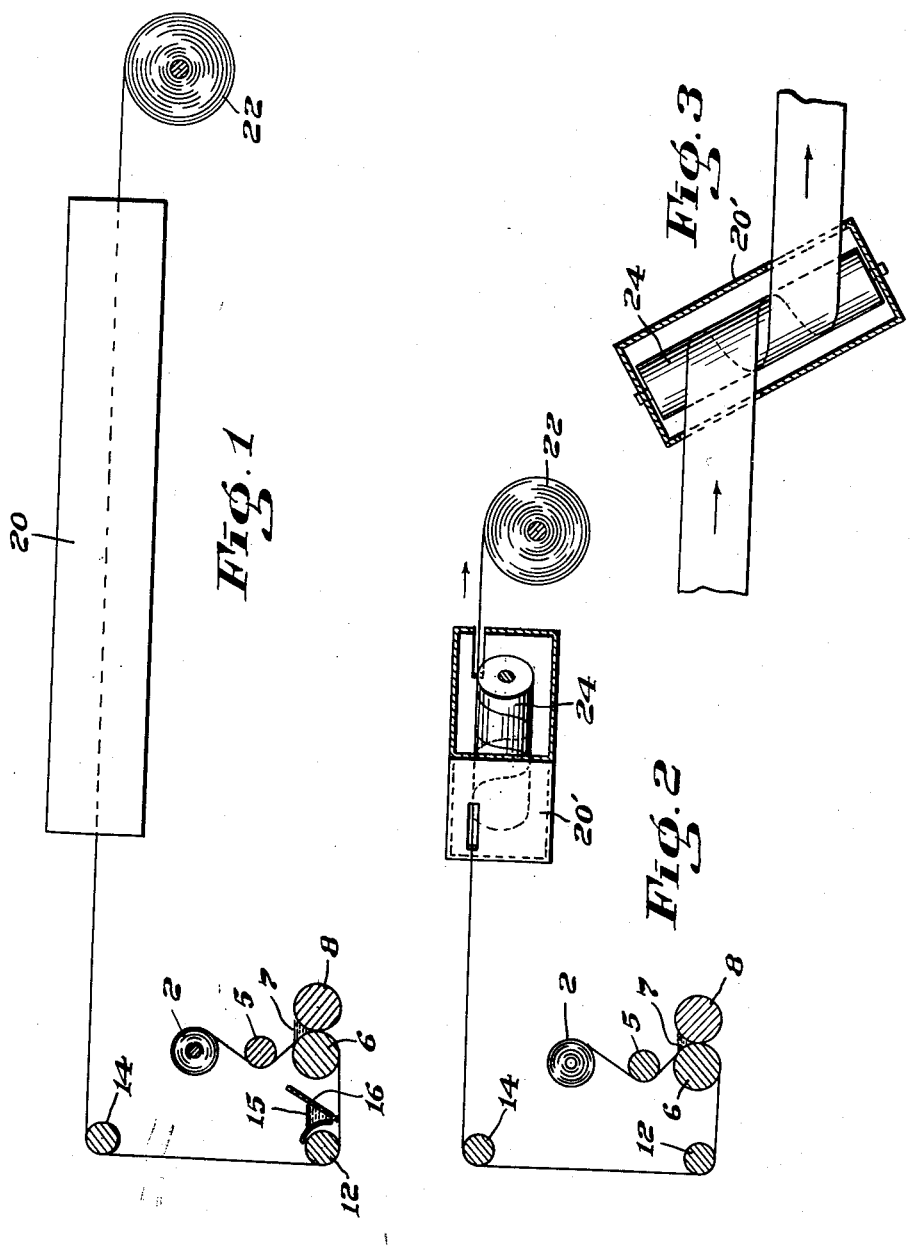
INVENTOR.
BY Wilfred M. Bright
Rowland V. Patrick
ATTORNEY

United States Patent Office 2,695,251
Patented Nov. 23, 1954

2,695,251

METHODS OF PRODUCING ELASTIC ADHESIVE SHEETS

Willard M. Bright, Chicago, Ill., assignor to The Kendall Company, Boston, Mass., a corporation of Massachusetts Application August 24, 1948, Serial No. 45,903

2 Claims. (Cl. 117—103)

This invention relates to adhesive sheets and more particularly to extensible, elastic adhesive sheets having as backing elements sheets comprising an ethenoid polymer or an ethenoid polymer compound, for example polyethylene or modified polyethylene. More specifically, the invention relates to the production of extensible, elastic pressure-sensitive adhesive tapes having such sheet backing elements.

Ethenoid polymers, for example polyethylene, in sheet form, normally exhibit very little affinity for adhesive coating materials. Their surfaces are paraffinic in nature and non-polar acting. Also, since such sheet materials possess considerable elongation, coating materials therefor desirably include elastomeric constituents and the commonest of these have very little affinity for non-polar surfaces.

In use as adhesive sheet backings, ethenoid polymers are not therefore classifiable with other smooth, non-fibrous sheet materials like cellophane, cellulose acetate or ethyl cellulose, both because of their extensibility and because of their highly inferior adhesive receptivity. Successful adhesive sheets, particularly pressure-sensitive adhesive sheets, cannot be formed from elastic ethanoid polymer sheets as backing elements by treatments successfully used in the case of other heretofore commonly used inelastic non-fibrous sheet materials which do not exhibit the extensibility and physico-chemical lack of affinity for elastomer-containing adhesive materials encountered in the case of ethenoid polymers.

It is a primary object of this invention to produce an extensible elastic adhesive sheet material having a non-fibrous ethenoid polymer or ethenoid polymer compound sheet backing element, as hereinafter defined, and wherein the adhesive coating may include an elastomer-containing pressure-sensitive adhesive to provide an extensible elastic pressure-sensitive adhesive tape with the pressure-sensitive adhesive firmly affixed to the backing element with sufficient tenacity to permit the tape to be handled in roll or sheet form in the same manner as any ordinary industrial or surgical pressure-sensitive adhesive tape.

Sheet backings of this invention may include thin sheets of solid ethenoid polymers such as those of average molecular weight exceeding 2500, and preferably in the range of about 15,000 to 30,000, obtained by heating ethylene at elevated temperature to a pressure of at least 500 atmospheres in the presence of one or more organic compounds containing one or more double bonds and capable of forming dimers or higher polymers; the ethenoid polymers having a composition corresponding substantially to the empirical formula

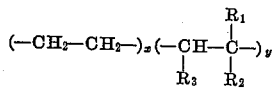

where $R_1$ is hydrogen or an alkyl group; and $R_2$ and $R_3$ are monovalent radicals such as hydrogen, alkyl, phenyl or substituted phenyl or vinyl, or substituted vinyl, and the ratio $x:y$ exceed 1:5, and is preferably greater than 1:1; having a melting or softening point greater than 212° F. and preferably in the range of 212 to 350° F. (A. S. T. M. D569–43); and exhibiting a crystalline structure by X-ray diffraction analysis. Preparation of solid ethenoid polymers and interpolymers of this type are described in United States Patent No. 2,153,553 and British Patent No. 497,643, the homo-polymer being polyethylene. Useful solid ethenoid interpolymers may include copolymers of ethylene and styrene where the ratio $x:y$ is 1:3, 1:1 or 3:2; of ethylene and pentene-2 where the ratio $x:y$ is 4:1, and of ethylene and stilbene where the ratio $x:y$ is 5:1.

Such ethenoid polymers may be and are desirably modified in the direction of greater flexibility and elasticity by compounding therewith, to form homogeneous bulk blends, hydrocarbon elastomers such as crude rubber, reclaim rubber, balata, polybutene, polybutadiene and butadiene and isoprene or styrene copolymers, preferably in the form of solids having molecular weights exceeding 40,000, although lower molecular weight elasto-viscous forms of these or other hydrocarbon polymers may be substituted in whole or in part, such as those having molecular weights ranging from 1,000 to 40,000. The proportions may run up to 66% by weight of the ethenoid polymer. Likewise pigments or coloring material may be homogeneously blended with the polymers.

Thin sheet material may be formed from such ethenoid polymer masses or elastomer or otherwise modified blends by a variety of methods including casting, molding or extruding from volatile solutions or sheeting on the hot roll of a rubber mill, as described, for example, in British Patent No. 474,426 and United States Latham Patent No. 2,369,471, to produce sheets which have substantial extensibility in the range of 400 to 800% elongation in a 4-mil film. Such sheets may be molecularly oriented by cold drawing to reduce their elongation in the direction of drawing and somewhat increase their tensile strength.

Or, molecularly oriented sheets of the above ethenoid polymers or ethenoid-polymer-elastomer-modified compounds of the type described and claimed in my application Serial No. 641,903 now Patent No. 2,631,954 (filed simultaneously with my co-pending application Serial No. 641,902, now abandoned, of which this application is a continuation in part) and formed directly from unoriented masses of such polymers or polymer compounds, may be used.

Adhesive sheet materials of this invention have a novel interface between the sheet backing hereof and the adhesive layer made possible by capitalizing on certain unique characteristics of the backing. This novel interface is attained in accordance with this invention without altering the appearance or physical or chemical characteristics of the back surface of the sheet so that the sheet material possesses the extensibility, elasticity, high tensile strength, tear resistance, and solvent resistance, exceedingly high dielectric strength and exceedingly low moisture vapor transmission of the ethenoid polymer or ethenoid polymer compound backing element. In the case of pressure-sensitive adhesive layers applied to one side of the backing element the interface provides, in effect, a differential adhesion of the adhesive material to the face of the sheet as compared with its adhesion to the unchanged back surface of the sheet.

The novel interface structure of adhesive sheet materials of this invention is founded upon the unique characteristic of all the above sheets of having rapidly increasing sensitivity to hydrocarbon and halogenated hydrocarbon attack under the influence of heat, and provides structures wherein the adhesive materials applied to the backing elements contain hydrocarbons, and wherein the interface between adhesive and backing is characterized by a region containing a gradient of relative adhesive hydrocarbon and ethenoid polymer molecular concentrations rapidly decreasing in adhesive hydrocarbon concentration and rapidly increasing in ethenoid polymer concentration from the adhesive stratum to the backing stratum. This interface is produced by controlledly causing the hydrocarbon of the adhesive to attack and interact with the sheet material in such manner as to produce a kind of adhesion adequate to prevent delamination at the interface during ordinary adhesive tape handling and use. As will be hereinafter described, the interface may be formed by the same or a different adhesive than that forming the exposed surface of the tape.

The unique characteristic of sensitivity to hydrocarbon and halogenated hydrocarbon attack of the backing sheets hereof manifests itself in one way in the solubility characteristics of such sheets in liquid hydrocarbon and halogenated hydrocarbon solvents; these sheets have a limited but very real solubility in liquid hydrocarbon and halogenated hydrocarbon solvents at elevated temperatures below the softening points of the sheets, the solubility rising very rapidly with increase of temperature, in accordance with thermo-dynamic concepts for crystalline materials.

One type of interface structure of this invention is produced by coating the backing element with an adhesive material of a kind that is soluble at room temperatures in the same hydrocarbon or halogenated hydrocarbon solvent as the backing is limitedly soluble at elevated temperature, and subjecting the combined adhesive and backing during the coating operation to a temperature below the softening point of the backing but above the threshold of solubility of the backing in the solvent and high enough to produce a mutual dissolution of the adhesive and backing in the solvent prior to the time the solvent is driven off. For the purposes of this invention temperature threshold of solubility is defined as that temperature at which the solubility of the ethenoid polymer is .1% by weight in the particular solvent chosen. In this instance, the production of the desired interface structure is dependent upon the mutual solubility of adhesive and backing components in the liquid solvent of application at the temperature of application. Mutual liquid solvent solubility is therefore one form of controlled attack which produces a region of gradient molecular concentrations such as characterizes the interface structures of the adhesive sheets of this invention.

The solvent carried adhesive and backing may be subjected to the elevated temperature necessary to produce the interface structure of this invention at the time of or after application of the solvent carried adhesive material to the backing, but, preferably, the solvent carried adhesive material is applied to the sheet backing element and the interface is then raised to the required elevated temperature and the solvent is driven off. Operation of the invention is not limited to the use of hydrocarbon solvents in the restrictive sense of that word but halogen derivatives of hydrocarbon may be used as well. Polyhalogenated hydrocarbon solvents such as carbon tetrachloride, ethylene chloride, ethylidene bromide and trichloroethylene are useful examples of suitable solvents. Nor is the operation of the invention limited to solvents having boiling points below 190° F. Solvents having boiling points in excess of 190° F. are suitable where the vapor pressure is high enough to allow drying under conditions well known in the coating art.

When liquid hydrocarbon or halogenated hydrocarbon solvents are used, certain precautions are however necessary. First, in the case of polyethylene Resin DYNH (Carbide & Carbon Chemicals Corporation) due to the low softening point of the backing, the temperature of the sheet cannot be safely raised above 190° F., but at this temperature the sensitivity of the sheet to the hydrocarbon or halogenated hydrocarbon solvent results in substantial curling and warping of the sheet unless the coating is very thin. Accordingly, it is preferred to apply initially to the backing a very thin coat, with the sheet heated to a temperature of about 170° F. before the solvent is driven off. Alternatively, anti-curl techniques may be adopted, for example, in the form of substantially simultaneous application to the back surface of the backing of a countercurl agent in the form of a hydrocarbon or halogenated hydrocarbon solvent having a higher boiling point than that of the adhesive hydrocarbon or halogenated hydrocarbon solvent, or by tensioning the sheet as over a drum during application of the elevated temperature.

In the case of molecularly oriented films, in addition to the problem of curling, the orientation renders the sheet highly sensitive to elevated temperature, the sheet shrinking so much at 190° F. as often to cause breakage of the film in any continuous spreading operation. Temperatures not exceeding 170° F. in the case of the oriented polyethylene are therefore maximum whether or not the thin coat or the countercurl agent technique is utilized.

For the purpose of further setting forth techniques producing the novel interface structure of this invention, the following examples are given:

*Example 1*

A molecularly unoriented sheet, cast from a blend of polyethylene (softening point of about 220° F.) and about 10% by weight of the polyethylene of Vistanex B–100 of molecular weight averaging 50,000, is passed through a solvent coating machine which applies a 0.3 mil coat when dry, from a solution consisting of equal parts of polybutene (Vistanex B–100) and Piccolyte (melting point 100° C., Pennsylvania Industrial Chemical Corporation) in 6 parts by weight of a gasoline type solvent (Petrolene, boiling range 61–96° C.) and then led into and through an oven which subjects the sheet to flash drying at an oven temperature of approximately 185° F.

*Example 1a*

In the above example 8.5 parts by weight of halogenated hydrocarbon solvent (trichloroethylene, boiling point 86.7° C.) are substituted for the gasoline type solvent.

Both examples produce an undistorted sheet ready for application of a pressure-sensitive adhesive over the 0.3 mil anchoring coat.

*Example 2*

A molecularly oriented sheet having the differential surface characteristics described in my application Ser. No. 641,903, and formed as therein described from a blend as set forth in Example 1 above, is solvent coated on its rougher surface with the material and in the manner set forth in Examples 1 and 1a but is flash dried at an oven temperature of approximately 170° instead of 185° F.

These produce an undistorted molecularly oriented sheet ready for application of a pressure-sensitive adhesive over the thin anchoring coat.

*Example 3*

A molecularly unoriented sheet of the type utilized in Example 1 is coated on a solvent coating machine with a 1 to 1.5 mil thickness of a surgical-type pressure-sensitive adhesive, as follows:

| | Parts by weight |
|---|---|
| Polybutene (Vistanex med.) | 11 |
| Butadiene-styrene copolymer | 4 |
| Factice | 16 |
| Resin (Staybelite ester #10—hydrogenated glycerol abietate) | 30 |
| Plasticizer (low molecular weight polybutene) | 18 |
| Filler (zinc oxide) | 18 |
| Wax | 2 |
| Hydrocarbon solvent (boiling range 61–96° C.) | 350 |

The sheet is led into an oven to a drum dryer and submitted on the drum to a sheet temperature of approximately 185° F.

*Example 3a*

In the formula of Example 3 the hydrocarbon solvent is Toluene, boiling point 110° C.

*Example 3b*

In the formula of Example 3 the hydrocarbon solvent is replaced by 510 parts by weight of a halogenated hydrocarbon solvent (trichloroethylene, boiling point 86.7° C.).

These produce an undistorted pressure-sensitive adhesive coated tape in accordance with this invention.

*Example 4*

A molecularly unoriented sheet, as used in Example 1 or 1a, is coated as in Example 3, 3a or 3b, with a 1 to 1.5 mil thickness of the adhesive of Example 3. Its back surface is then given a thin coating of a countercurl agent in the form of a high flash naphtha (boiling range 147–185° C.). The doubly coated sheet is then passed unsupported through an oven at a sheet temperature of approximately 185° F.

*Example 5*

The coated sheet of Example 1 is further successively coated on the anchor coat side with 0.3 mil thickness coats of the pressure-sensitive adhesive of Example 3 and flash dried in an oven at a temperature of approximately 185° F. after each coating until the coatings are built up to a total thickness of 1–1.5 mils.

*Example 6*

The coated sheet of Example 1 is further coated on the anchor coat side with a 1 to 1.5 mil thickness of the pressure-sensitive adhesive of Example 3 and led to a drum dryer at a drying temperature of 190° F.

Example 7

The coated sheet of Example 1 is further coated on the anchor coat side with a 1 to 1.5 mil thickness of the adhesive of Example 3; an aromatic hydrocarbon solvent is applied on the other side and the sheet then led through an oven at an oven temperature of approximately 185° F.

Example 8

The coated molecularly oriented sheet of Example 2 is coated on its anchor coat side with a pressure-sensitive adhesive by the method used in Example 5 except that the drying temperature is 170° instead of 185° F.

Example 9

The coated molecularly oriented sheet of Example 2 is coated on the anchor coat side with a pressure-sensitive adhesive by the method used in Example 6 except that the drying temperature is 170° instead of 185° F.

Example 10

The coated molecularly oriented sheet of Example 2 is coated on its anchor coat side with a pressure-sensitive adhesive by the method used in Example 7 except that the drying temperature is 170 instead of 185° F.

Example 11

Sheets are produced following the procedures of Examples 1 to 10, inclusive, except that the hydrocarbon elastomer, polybutene, was omitted from the anchor coat.

Each of Examples 4 to 10, inclusive, and the sheets of Example 11 produce undistorted pressure-sensitive adhesive tapes in accordance with this invention which can be rolled and unrolled on their own backings without delamination of the adhesive layers.

As will be understood, other pressure-sensitive adhesives, pigmented, colored or transparent, may be used. However, the elastomer components thereof, if present, or the resinous component should be compatible with the ethenoid polymer, if applied directly to the backing, and must be soluble in any hydrocarbon solvent which is utilized in coating the adhesive.

The sheets of Example 2 may if desired be provided with an overlying coat of an adhesive, hydrocarbon soluble or otherwise, which is calendered or hot melt spread onto the primed surface. The hot melt method may likewise be utilized for a primed sheet of Example 1, but calendering is not feasible because of the great extensibility of the unoriented sheet which results in the sheet breaking an attempt is made to strip the combined unoriented film and calendered adhesive from the calendering roll.

In the drawings,

Fig. 1 diagramatically illustrates apparatus suitable for applying an anti-curling agent to the back surface of the sheet;

Fig. 2 diagrammatically illustrates apparatus including a drum dryer; and

Fig. 3 is a diagrammatic plan of a portion of the apparatus shown in Fig. 2.

Fig. 1 illustrates a solvent coating apparatus wherein a sheet of ethenoid polymer 2 is fed from a roll source of supply around a roll 5 and between rolls 6 and 8 through a well of adhesive material 7 maintained between rolls 6 and 8 so that, as the sheet emerges from the nip between rolls 6 and 8, it carries a coating on its under side of adhesive material. The sheet is then led around roll 12, previous to which there is coated on its top surface a counter-curl agent 15 as from a trough indicated at 16 to coat the other side of the sheet 2 with a solvent of higher boiling point and the sheet is then carried over roll 14 through oven 20 to take-up roll 22.

In Fig. 2 the trough 16 is omitted and oven 20' is provided with a drum dryer 24 mounted for rotation on an axis disposed at an angle to the direction of advance of the sheet 2 so that the material winds on the drum, coated face out, for one or more convolutions depending upon the width of the drum 24 and is then led out of the oven to take-up roll 22.

The unique characteristic of sensitivity to hydrocarbon and halogenated hydrocarbon attack of the backing sheets hereof also manifests itself in the interaction of solid hydrocarbons therewith at elevated temperature and under pressure.

Another type of interface structure of this invention is therefore produced by applying an adhesive material to the sheet backings hereof by a calendering operation, as on a three-roll calender, during which the combined backing and adhesive are subjected to an elevated temperature substantially that required for mutual solubility in case liquid solvents are present. The hydrocarbons of the adhesive, even in the absence of liquid solvents, attack the sheet backing material and cause a mutual dissolution which produces at the interface a region of gradient concentration similar to but not as accentuated as that produced where a mutual liquid solvent is present at the time of application of heat. Due, however, to the nature of the calendering operation, this method of application is confined to sheets having sufficient tensile strength and/or resistance to stretch to withstand stripping from the calender without tearing, i. e., in most cases to molecularly oriented sheets.

Example 12

Instead of providing the molecularly oriented sheet utilized in Example 2 with an anchor coat, the sheet has applied directly thereto on its rougher surface a 1 to 1.5 mil layer of the adhesive of Example 3 by a three-roll calender operation, wherein the middle roll of the calender is maintained at a temperature of 160—170° F., and the bottom roll at 140—150° F. This produces an undistorted pressure-sensitive adhesive tape which can be rolled or unrolled on its backing without delamination of the adhesive layer by reason of the novel interface produced by the application of heat at the nip between the bottom and center roll.

Adhesive sheets of this invention are particularly useful in the formation of surgical adhesive products wherein a portion of the adhesive sheet bears a dressing in the form of gauze or the like, other portions of the sheet having their surfaces exposed for affixing the bandage to the skin.

Such bandages may be readily made from molecularly oriented adhesive sheets of this invention wherein the bandages are cut from the molecularly oriented sheet in such manner that the direction of molecular orientation runs transversely of the bandage whereby the bandage will be extensible in the direction of its length and permit ready conformance thereof to irregular surfaces, as in bandaging fingers.

I claim:

1. The method of adhering a pressure-sensitive adhesive material soluble in a solvent chosen from the group consisting of volatile hydrocarbon and halogenated hydrocarbon solvents to a self-supporting molecularly oriented film consisting essentially of a solid ethenoid polymer which is insoluble in the solvents of said group under normal conditions, and which corresponds to the empirical formula:

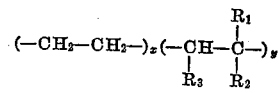

where $R_1$ is hydrogen or an alkyl group; and $R_2$ and $R_3$ are monovalent radicals falling within the group hydrogen, alkyl, phenyl, substituted phenyl, vinyl, substituted vinyl; and the ratio $x:y$ exceeds 1.5; comprising applying said pressure-sensitive adhesive material to said film in a solvent of the said group and subjecting the applied solvent-carried adsesive and film to a temperature above the threshold of solubility of the ethenoid polymer in the chosen solvent but not exceeding 170° F. and driving off said solvent.

2. The method as claimed in claim 1, wherein the ethenoid polymer is polyethylene and the pressure-sensitive adhesive material comprises polybutene.

References Cited in the file of this patent

UNITED STATES PATENTS

| Number | Name | Date |
|---|---|---|
| 2,319,959 | Tierney | May 25, 1943 |
| 2,395,419 | Mitchell | Feb. 26, 1946 |
| 2,429,861 | Woodbridge | Oct. 28, 1947 |
| 2,462,977 | Kitchin et al. | Mar. 1, 1949 |